Sept. 8, 1970
B. T. SUBBOTIN
3,527,687
SYSTEM FOR REMOTE DETERMINATION OF LIQUID LEVELS
Filed June 13, 1966
4 Sheets-Sheet 1
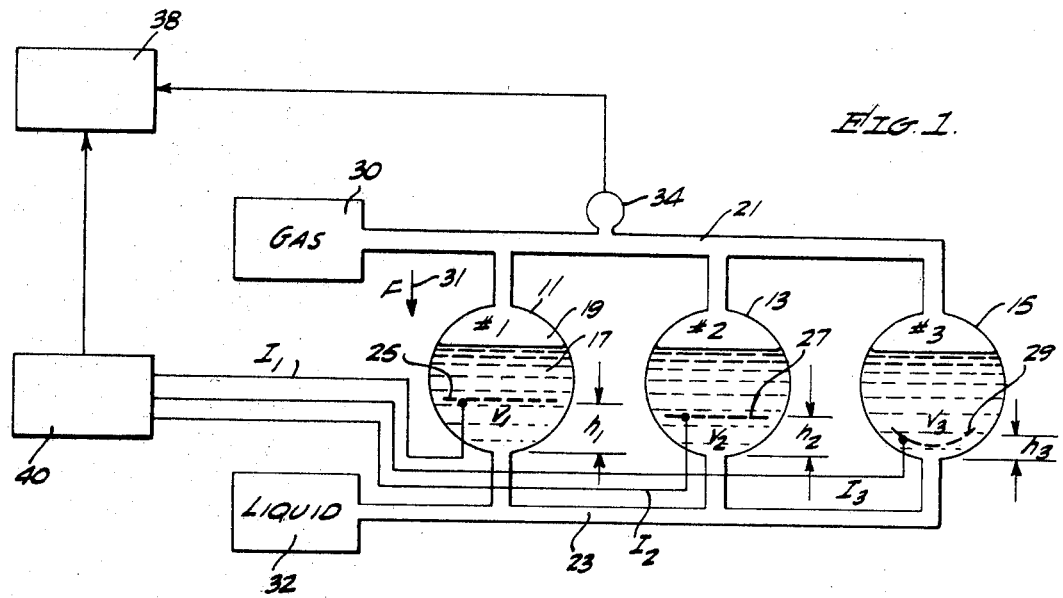
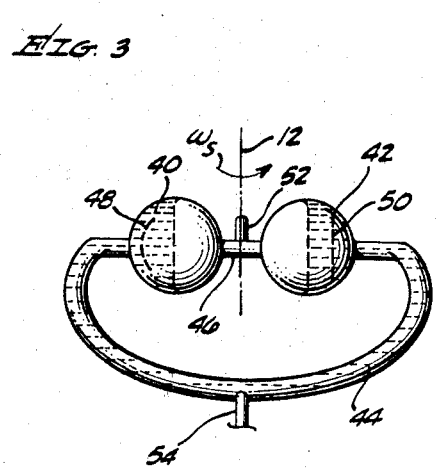
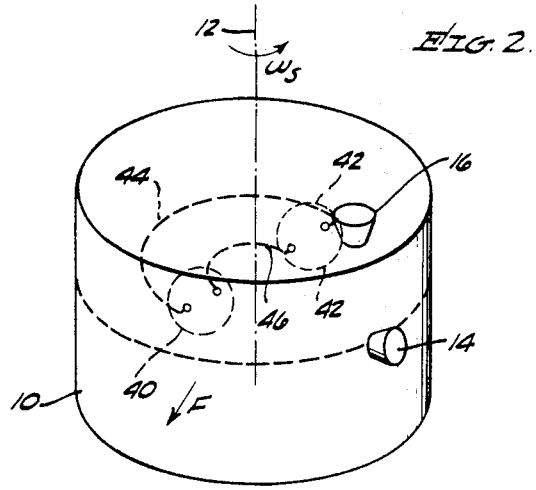
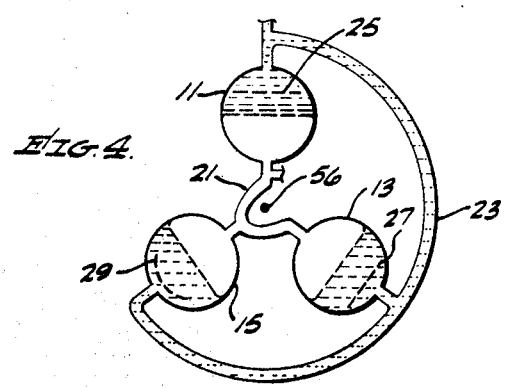
INVENTOR.
BORIS T. SUBBOTIN,
BY
Walter J. Adam
ATTORNEY

United States Patent Office 3,527,687
Patented Sept. 8, 1970

3,527,687
SYSTEM FOR REMOTE DETERMINATION OF LIQUID LEVELS
Boris T. Subbotin, Van Nuys, Calif., assignor to Hughes Aircraft Company, Culver City, Calif., a corporation of Delaware
Filed June 13, 1966, Ser. No. 557,164
Int. Cl. B01k 3/00
U.S. Cl. 204—230         6 Claims

ABSTRACT OF THE DISCLOSURE

A system for remotely indicating the level of liquid in a plurality of interconnected containers in which the liquid is being electrolyzed. The system is especially applicable in a spinning body where liquid level is desirably remotely determined when only a small amount of liquid remains, that is, near the end of life of the equipment. The electrodes are positioned at different common levels or positions in each tank so that either the electrolysis current or the rate of pressure rise provide a reliable indication of remaining liquid volume.

---

This invention relates to liquid level determining systems and particulraly to a simplified and reliable system for providing remote determinations of the levels or volumes of liquid or pressurizing materials.

Remote determination of liquid or fluid levels may be performed with conventional liquid level determining devices such as a float controlling a voltage level, for example. In many systems, it is desirable that liquid levels be determined with a minimum of additional equipment and often without any additional equipment inside of the liquid tanks. Also it is often necessary that liquid levels be known at a remote station or position with a minimum of equipment required to transmit the level information thereto. In electrolysis systems, for example, where either the liquid or the gas phase may be the useful product, that is, where the liquid may be converted to gases at current supplying electrodes for pressurizing the container so that either the liquid or the gases may be forced to a utilization device for use in a chemical process, it is desirable to know the volume of remaining liquid as this will indicate the remaining life of the process. It is especially desirable to accurately know the amount of remaining liquid when an end of liquid condition is being approached. One type of system in which the liquid level is monitored from a remote source, is one in which the liquid is maintained in a plurality of interconnected tanks mounted on a moving surface or body. For example, in a rotating or spinning body, the liquid is often maintained in a plurality of tanks having a common or related liquid level so that weight balanced conditions are maintained at all times. When the liquid is being subjected to a reaction, especially to a reaction that occurs over a relatively long period of time such as being electrolyzed, a simplified system for remotely determining liquid level and with accuracy toward the end of the liquid supply, would be highly desirable. For example, if the liquid is being converted to gas for providing a propulsion system, an improved liquid level determining system requiring a very small amount of equipment and providing an accurate remote indication toward the end of the fuel supply would be desirable.

It is therefore an object of this invention to provide a simplified and reliable system for remote determination of liquid levels.

It is a further object of this invention to provide a system to determine end of life of a pressurization system.

It is a still further object of this invention to provide a system for remote determination of liquid levels in a spinning or moving body.

It is another object of this invention to provide a system for remotely determining the remaining life for an electrolysis propulsion system with a minimum of measuring and information conveying equipment.

It is still another object of this invention to provide a liquid level measuring system in which none of the volume of the tanks is utilized to provide remote liquid level determinations.

Briefly the arrangement in accordance with the principles of the invention is operable in a system utilizing a liquid to perform or provide a desired function such as a source of pressure or propulsion, for example, and in which the liquid is maintained in a plurality of tanks or containers and has a common or related liquid level. The system is especially applicable in a moving or spinning body where remote determinations of liquid level is required. The liquid may be utilized either as a source of chemical material or as a propellant, and with the gaseous byproduct as the pressurant or with the gaseous product as the source of gas or of propellant. Also, the liquid may be utilized in a hybrid system that may be a combination of these pressurization and utilization arrangements. For electrolysis operation, an electrode structure is placed in each of a plurality of tanks having both their liquid and gaseous portion interconnected to provide a common or interrelated liquid level, so that each electrode is uncovered upon occurrence of a different common liquid level. Either the current supplied to the electrodes or the rate of pressure rise each time current is applied thereto is transmitted to the monitoring stations for providing an indication of the remaining liquid level. As each electrode structure is uncovered to become ineffective, the amount of current decreases and the rate of pressure rise decreases. By knowing the volume of liquid remaining when each anode structure is no longer immersed in liquid, the remaining liquid may be remotely determined. The system allows substantially all of the liquid in the tanks to be utilized while only changing the rate of liquid electrolysis during the period of level determination.

The novel features of the invention, as well as the invention itself, both as to its organization and method of operation, will best be understood from the accompanying description taken in connection with the accompanying drawings, in which like reference characters refer to like parts, and in which:

FIG. 1 is a schematic diagram of the liquid level determination system in accordance with the invention;

FIG. 2 is a perspective view of a spinning body having a dual tank system of liquid which may be electrolyzed in accordance with the principles of the invention;

FIG. 3 is a schematic diagram for further explaining the two tank system of FIG. 2;

FIG. 4 is a schematic diagram of the three tanks of FIG. 1 arranged around a spin axis in accordance with the principles of the invention;

Figure 5:
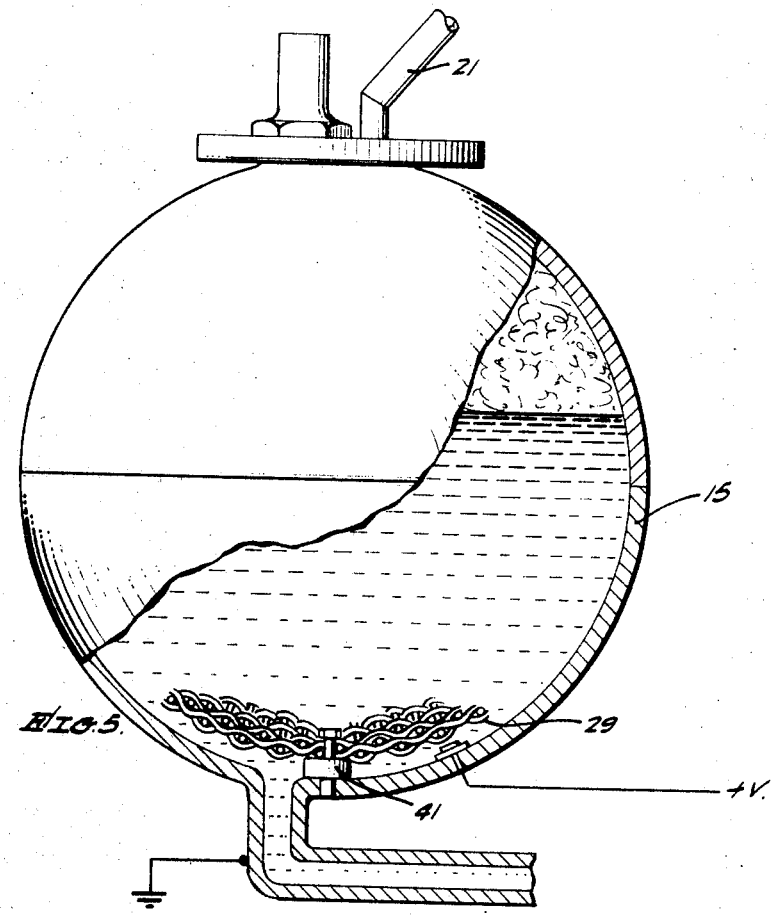
FIG. 5 is a side elevational view of a gas generating tank of FIGS. 1, 2, 3 and 4 with a portion broken away to indicate the arrangement of the electrode.

Referring first to FIG. 1, the system of the invention may include tanks 11, 13 and 15 each containing a fluid or liquid 17 and with a gas 19 in the adjacent space of the tanks. A gas equalizing line 21 and a liquid equalizing line 23 may interconnect the tanks 11, 13 and 15 so that a common liquid level or liquid surface position is maintained in all tanks. In the liquid of each tank 11, 13 and 15 respective electrodes 25, 27 and 29 are positioned at different levels for responding to current and providing electrolysis of the liquid 17. For example, if the liquid 17 is water ($H_2O$) with an electrolyte therein, $H_2$ and $O_2$ gas are developed in the space 19 to provide a tank pressure as a function of the amount of gas developed. The level of the liquid 17 is maintained common in all tanks in response to a force F applied to the equipment and forcing the liquid in one direction as indicated by an arrow 31. The force F may result from gravity when the system of FIG. 1 is stationary or may result from movement of the mass. If the gas phase is utilized as a pressure source or as a source of energy or reacting material, the line 21 is coupled to a utilization device 30 and if the liquid is utilized as a source of pressure or energy or reacting material, the line 23 is coupled to a utilization device 32. For remote determination of the liquid level, which level is common for all tanks, a pressure transducer 34 connected to the line 21 may transmit or conduct the pressure data to a remote station 38. Also, a current source 40 may measure the currents $I_1$, $I_2$ and $I_3$ applied to the electrodes 25, 27 and 29 and transmit or conduct the current data to the remote station 38. Either the rate of pressure rise after any pressure drop, or the current provided to the electrodes may be monitored to indicate the liquid level at the remote station 38. For example, at the time when the electrode 25 is uncovered by the liquid 17, the current $I_1$ decreases to substantially zero, and the volume of remaining liquid is known to be three times the volume $V_1$, at the time when the electrode 27 is uncovered the remaining liquid volume is known to be three times $V_2$, and when the electrode 29 is uncovered, the remaining liquid volume is known to be three times the volume $V_3$. The volume $V_1$ is determined to be the volume of liquid in the tank 11 when the anode 25 becomes totally uncovered. In accordance with the principles of the invention the volumes $V_1$, $V_2$ and $V_3$ may have any known relation but the levels of the anodes relative to the common liquid level must be different for each anode 25, 27 and 29. However, for utilization of the maximum amount of liquid, the volume $V_3$ should be a minimum amount. For example, when the force F provides a liquid with a substantially flat surface, the anodes 25 and 27 may be flat and the anode 29 may have a spherical shape. Because the rate of pressure rise of the gas phase is a function of the number of electrodes that are active or covered with liquid, this parameter also provides a determination of the liquid level to the remote station 38.

Referring now to FIG. 2, the system in accordance with the invention may be included in a spinning body structure 10 movable around an axis 12 at a frequency $\omega_s$, which movement may be provided by a suitable motor drive system or by any suitable force applied to the body structure 10. The body 10 may include tanks 40 and 42 interconnected by respective liquid and gas equalizing lines 44 and 46. The spinning movement of the body 10 may develop the force F radial from the axis 12 so that the liquid is force radially from the axis 12 with a common level relative to the axis 12 or force F. The force F, which is a function of the angular spin velocity, the radius to the liquid and to the different tanks, controls the common liquid level as is well known in the art. The system of the tanks 40 and 42 may be utilized in the spinning body 10 for providing either pressure or material to elements or components within the body 10. Also, to maintain the spinning motion, propulsion gases may be supplied to a jet (not shown) in response to a remote command. As an illustrative example, the body 10 may be a satellite structure spinning around the axis 12 and controlling its position by respective axial and radial jets or motors 14 and 16 responsive to either gases or liquid from the tanks 40 and 42.

As shown in FIG. 3, the tanks 40 and 42 may include electrodes or anodes 48 and 50 respectively positioned at smaller and greater heights from the bottoms of the tanks as determined by the direction of the force F. If the system is utilized for pressurizing another container or utilization device (not shown) a lead 52 is connected to the line 46 and if the liquid is to be forced into another container or to a utilization device, a lead 54 may be connected to the line 44. It is to be noted that if the tanks are symmetrically positioned around the axis of motion such as 12, the common liquid level has a symmetrical relation to the tank position to which liquid is forced so that the anodes 48 and 50 may be positioned as shown. For providing balanced motion of the three tanks of FIG. 1 for movement around an axis, the arrangement of FIG. 4 shows the tanks 11, 13 and 15 symmetrically positioned around an axis 56.

As shown in FIG. 5, the anode 29 may be mounted by a structure 41 at a suitable position in the tank 15. The anode 29 may have a semi-spherical configuration to conform to the shape of the container.

Figure 6:
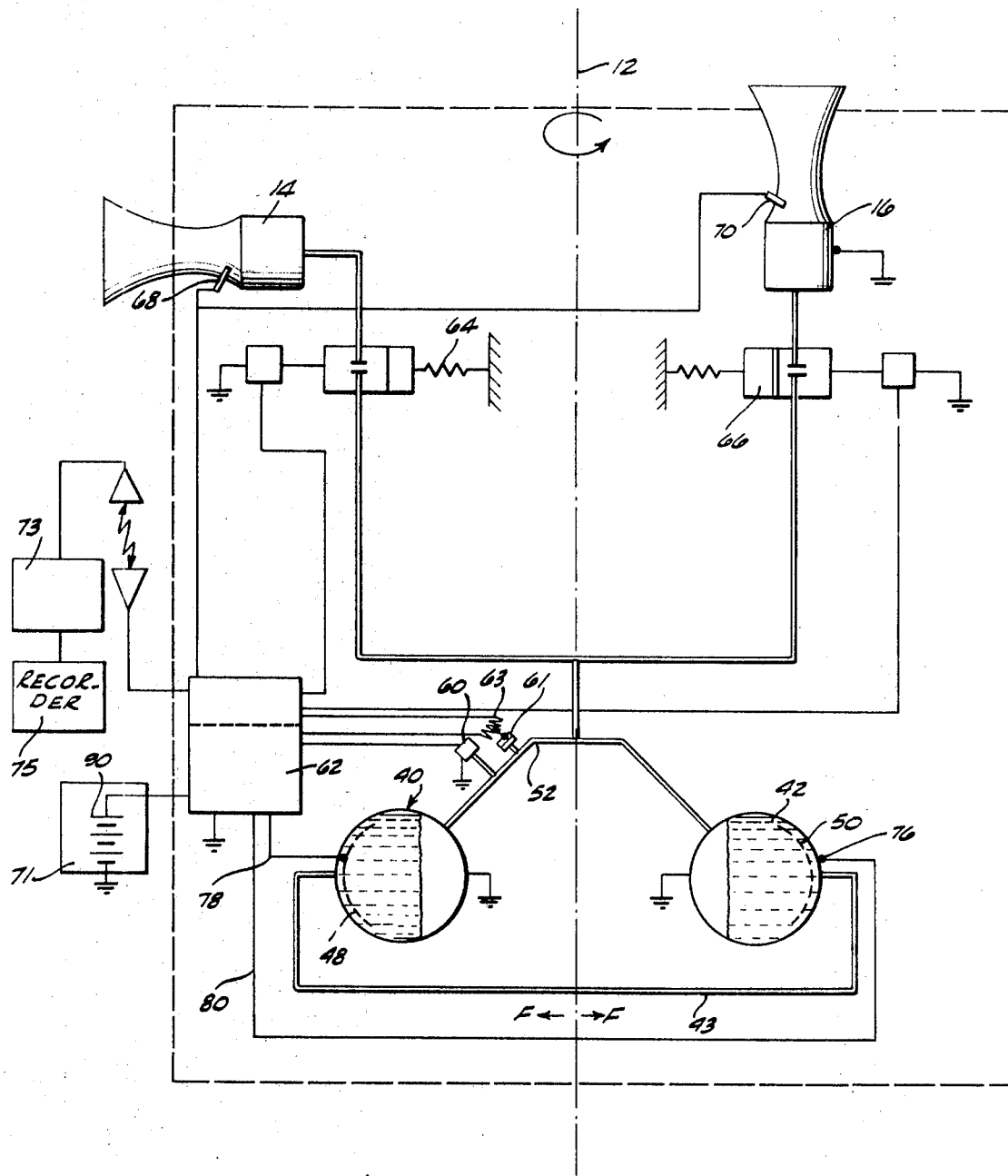
FIG. 6 is a schematic diagram of the measuring system utilized in a propulsion system on a spinning body in accordance with the principles of the invention.

In some systems such as may be utilized on a moving body, a remote and simplified determination may be desired of the level of liquid remaining in the pressurization or propulsion system. A pressurization or propulsion system may be utilized which is capable of frequent firing or pulsing for short time durations over a period that may extend for long periods of time. It is highly desirable that the end of life of the pressurization or propulsion system be accurately and reliably determined at a remote station because the moving body will eventually leave its position or become useless without a pressurization or propulsion system. For example, if a propulsion system is provided in a satellite, it may be desirable that an additional satellite be provided to replace the satellite before termination of the life thereof. As shown in FIG. 6, a liquid such as water, hydrogen peroxide ($H_2O_2$) or hydrazine ($N_2H_4$) for example, may be stored in the enclosed spherical chambers of the pair of spherical tanks 40 and 42 and is subjected to electrolysis in response to current applied to the electrodes 48 and 50. When water is stored in the tanks 40 and 42 with a suitable electrolyte therein such as KOH, the gases $H_2$ and $O_2$ are formed and collect above the liquid levels. A pressure switch 60 is actuated at a maximum pressure to apply a signal to a control circuit 62 and stop the electrolyzing action. Also the switch 60 responds to the pressure in the line 52 falling below a predetermined value to start the electrolyzing action, that is, to switch current to the electrodes 48 and 50. A pressure transducer 61 is provided and may move a tap along a resistor 63 to apply a pressure representative voltage to a control source 62. Command signals are also applied from the control source 62 to normally closed control valves 64 and 66 to flow the hydrogen and oxygen gas mixture to a combustion chamber of the pair of reaction engines 14 and 16. In the illustrated water propulsion system, a pair of spark plugs 68 and 70 are energized at substantially the same time that the solenoid valves are opened, to ignite the gases in the combustion chamber and thereby develop reaction forces at the engine nozzles. The source 62 may receive energy from a suitable source 71 including a battery 90 and may transmit and receive telemetry data to a receiving station 73 which may include a recorder such as a strip recorder 75. For some systems utilizing solar energy the source 71 may include solar cells to maintain the battery in a charged condition. When the propulsion system of FIG. 6 is utilized for station keeping of a synchronous satellite, one engine 16 would be directed along the satellite spin axis while the other engine 14 would be directed radially outward of the spin axis preferably in the plane of the center of gravity of the satellite.

To consider the tanks 40 and 42 in further detail, each tank is symmetrically arranged around the spin axis 12 so that liquid contained within the chambers is centrifugally forced radially outward by the force F. As can also be seen in FIG. 5, each chamber is made of carbon steel or an equivalent high strength electrically conductive material and can be nickel plated to reduce oxidation problems. Each chamber surrounds an electrolyzing anode 48 or 50 which in the water propulsion system is made of a nickel wire mesh or screen and is spaced from the chamber wall at the radially outermost portion thereof by an electrically insulated bushing or mounting 74 or 76 similar to the mounting 41 in FIG. 5. Electrical current supply leads 78 and 80 extend through the respective chambers 40 and 42 to supply current to the anodes 48 and 50 at a positive potential relative to a ground or reference potential. A substantially constant current is supplied to each anode while it is immersed in water. The tanks are in turn connected to a ground terminal thereby providing a cathodic surface relative to the anodic screens 48 and 50. With water in the tanks and current supplied to the anodes, bubbles of oxygen gas ($O_2$) are generated at the surface of the anode while bubbles of hydrogen gas ($H_2$) are generated on the cathodic wall of the chambers 40 and 42. These light weight bubbles of gas escape to a ullage space which is opposite along the line of force F from the position of the anode 48 and slowly build up a reservoir of pressurized intermixed hydrogen and oxygen gas within the chamber.

In order to aid the electrolysis action, an electrolyte such as potassium hydroxide is added to the water to set up desired electrolyte concentration such as 0.4 normal, that is, 0.4 gram mole per liter. As the water is used up and the concentration of KOH increases, less power is required to generate a predetermined quantity of gas. As will be explained subsequently, the voltage is decreased on the anodes when the KOH concentration increases so that a substantially constant current is utilized.

As soon as enough hydrogen and oxygen gas has been generated, the pressure build up in the ullage space and the manifold 52 is sufficient to close the pressure switch 60, thereby de-energizing the control circuit 62 and stopping the electrolyzing action. The gases will then remain in the ullage space under pressure until such time as they are needed. During storage, the two gases $O_2$ and $H_2$ have an exact mixture ratio of 8:1 by weight as fixed by the composition of water. Therefore, the water electrolysis system supplies a gas of known composition either for thrust, heat or for chemical reactions depending upon the gas utilization system.

Other types of liquids that may be monitored with the system in accordance with the invention are hydrogen peroxide ($H_2O_2$) in an electrolysis arrangement, which may utilize a suitable electrolyte. Another electrolysis system is hydrazine $N_2H_4$ for providing $N_2$ and $NH_3$ for a pressurization gas to force hydrazine to a suitable utilization device. The level determination in accordance with the invention is also applicable to systems where the electrolysis is utilized to provide pressurization to another system. For example, in a propulsion system the water ($H_2O$) or $H_2O_2$ may apply pressurized gas to a hydrocarbon fuel container in which a fuel such as kerosene or a biliquid combination such as monomethylhydrazine and Mon-Ten ($N_2O_4+10\%$ $NO_2$) are forced to a burning device such as an engine. The time for a pressure use of a predetermined amount may be utilized as a measure of the volume of the fuel or material being processed. Also the principles of the invention are applicable to systems in which a liquid is forced out of the container directly to a utilization device such as a system electrolyzing $H_2O_2$ for forming a gas with the pressurized liquid being forced to an engine for burning.

Figure 7:
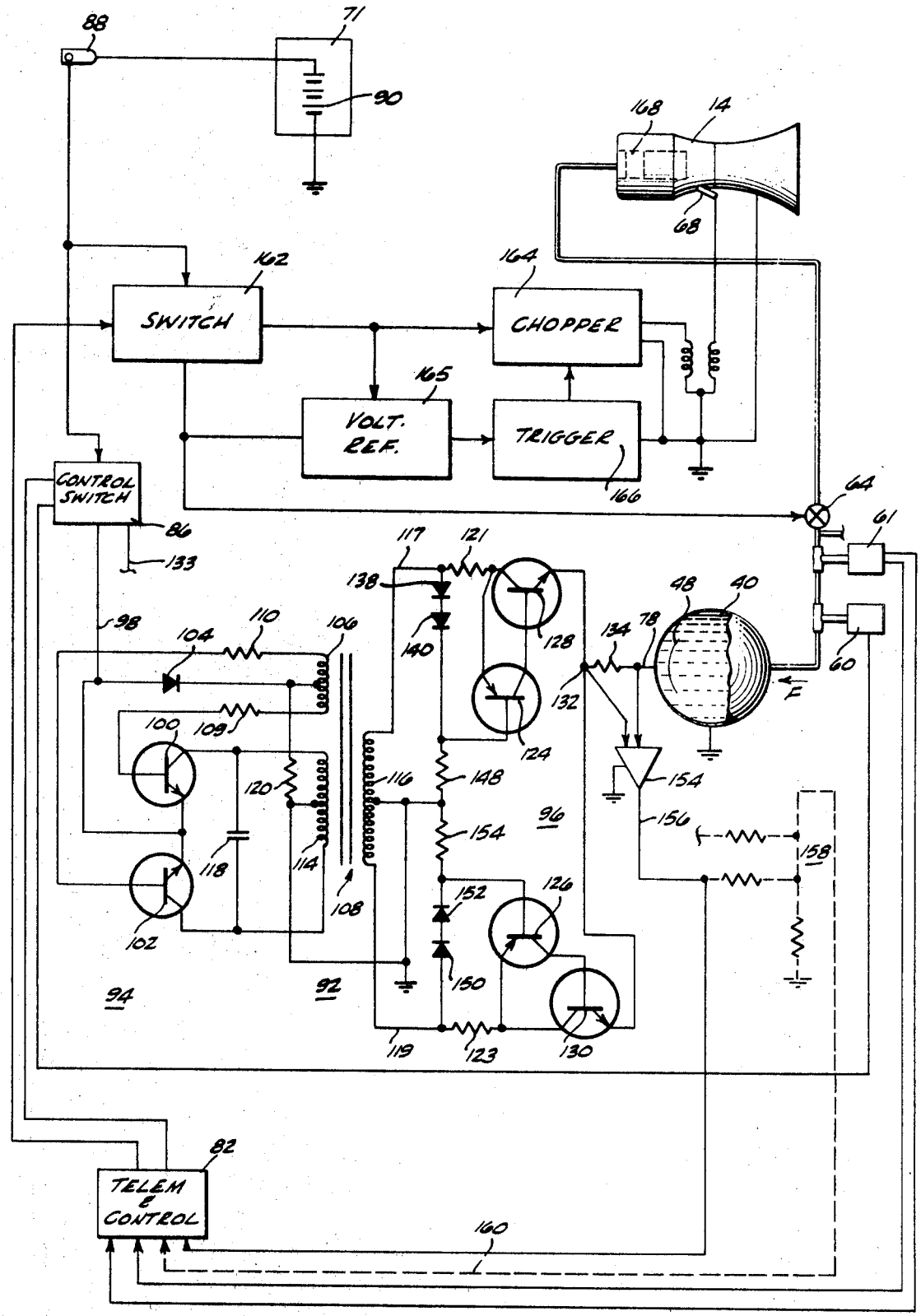
FIG. 7 is a schematic diagram further showing the system of the invention operating in a propulsion system.

Referring now to FIG. 7, a suitable electrolysis power supply and control system is shown for operation with the propulsion system of FIG. 6 as one example of a system including the principles of the invention. Although the illustrated system may be enclosed in a spinning body so that a force F is applied to the liquid, the force F may result from gravity rather than from a centrifugal force or from a combination of gravity and a movement. A control signal may be transmitted to a command circuit 82, of the circuit 62 (FIG. 6), including a telemetry transmitter and receiver for transmitting binary signals on a carrier signal with either FM (frequency modulation) or AM (amplitude modulation) as is well known in the art. Also, the information and control signals may be applied to or received from the monitored system through suitable wires in accordance with the principles of the invention. The circuit 82 activates a control switch 86 to initiate the flow of electrolyzing current to the spherical chamber 40. Current is conducted from a power supply terminal 88 responding to a suitable source of power such as the battery 90. The control switch 86 may be any conventional electromechanical or electronic switch used to apply the DC power to a DC–DC converter 92. A trigger circuit 94 develops an AC signal and a control circuit 96 applies a constant DC current to the anode 48.

Power is applied through the switch 86 to a lead 98 and in turn to the emitters of npn type transistors 100 and 102. The lead 98 is also coupled through a diode 104 to the center tap of a winding 106 of a transformer 108. The bases of the transistors 100 and 102 are coupled through respective resistors 109 and 110 to opposite ends of the winding 106. The transformer 108 which also includes windings 114 and 116 has a suitable core to provide a conventional square-loop magnetic AC to AC conversion. The collectors of the transistors 100 and 102 are coupled to opposite ends of the winding 114 as well as being intercoupled through a capacitor 118. A center tap of the winding 114 is coupled to ground and the center tap of the winding 106 is coupled to ground through a resistor 120. To control the rectifying operation, the winding 116 has a center tap coupled to ground and has opposite ends coupled through leads 117 and 119 and through respective resistors 121 and 123 to the emitters of pnp type transistors 124 and 126, the collectors of each being coupled to the bases of respective transistors 128 and 130. The collectors of the transistors 128 and 130 are respectively coupled to the leads 117 and 119 through the respective resistors 121 and 123 and the emitters of the transistors are coupled to a common lead 132 which in turn is coupled through a current measuring resistor 134 to the lead 78 and to the anode 48. The lead 117 is also coupled through Zener diodes 138 and 140 to the base of the transistor 124 and in turn through a resistor 148 to ground for providing a switching and control voltage to the transistor 124. Similarly the lead 119 is coupled through Zener diodes 150 and 152 to the base of the transistor 126 which in turn is coupled through a resistor 154 to ground for providing a switching and current regulation voltage to the transistor 126.

In operation, the control switch 86 is closed in response to the telemetry and control switch 82 to apply a DC voltage to the lead 98. The power signal may result from a telemetry command or a command from an external source or if the pressure in the container 40 has fallen below the limits of the pressure sensor or transducer 60, the switch 86 is closed. It is to be noted that the pressure transducer 61 may continually monitor the gas pressure to apply voltages to the circuit 82 which in turn may transmit the pressure information to a remote station. The transistors 100 and 102 are biased so that they alternately are conductive with the other being biased out of conduction at the same time as determined by the time constant of the resistor 120 and the capacitor 109 or by the turn over period of the core of the transformer 108. As each transistor 100 or 102 conducts, either the transistor 124 or 126 is biased into conduction along with the corresponding transistor 128 or 130 to apply a substantially constant DC current to the lead 132. Thus the AC to DC operation provides a desired change of voltage level and a substantially constant current flow. A similar power supply may be utilized for each tank or anode in the system and may receive current from the control switch 86 on a lead such as 133.

For metering the current supplied to the anode 48, the voltage drop across the relatively small resistor 134 may be applied to a DC amplifier 154 and through a lead 156 to the telemetry and control circuit 82 for transmission of the information to a remote station. If the total amount of current from all containers such as 40 and 42 (FIG. 6) is to be transmitted a summing circuit such as 158 may respond to measured current supplied to the anode of both or all containers, to apply to the circuit 82 a summed voltage through a dotted lead 160 representing the total electrolyzing current.

When propulsion forces are desired, a solenoid valve such as 64 is energized to release pressurized gases for flow into the combustion chamber of engine 14, for example. These valves such as 64 may be any commercially available solenoid type which have sufficiently fast opening times. A command signal received by the source 82 may be applied to a suitable control switch 162 to apply power to the control valve 64 and to a chopper circuit 164. Control switch 162 may be of any suitable electromechanical or electronic type. The chopper 164 may be any conventional free running vibrator such as described in FIG. 10.7 on p. 173 of the book, "Transistor Circuit Design," edited by the engineering staff of Texas Instruments, Inc. and published by McGraw-Hill Book Company. For circuit stability of the chopper 164, a reference circuit including a voltage reference source 165 and a trigger circuit 166 are coupled between the DC input power and the chopper 164 so as to provide a stable voltage reference and close frequency control of the trigger circuit 166. Voltage reference circuits 165 and trigger circuit 166 are of the conventional types such as respectively described on p. 153 of "Transistor Circuit Design" book and the Schmitt trigger shown on p. 169 of the General Electric Transistor "Manual" edited by General Electric, 6th ed. The AC output signal from the chopper 164 may be applied to the primary winding of an ignition coil to greatly increase the firing voltage. As is well known in the art, the engines such as 14 may include a porous plug 168, shown dotted, to prevent flashback of the flame into the gas generating system. For $H_2$ and $O_2$ gases, a sintered nickel plug about ⅛ inch thick having pore sizes of ten to 100 microns has been found suitable and with an acceptable pressure drop thereacross. In response to a signal to stop the engine, the valve 64 is closed and the chopper 164 is cut off.

Figure 8:
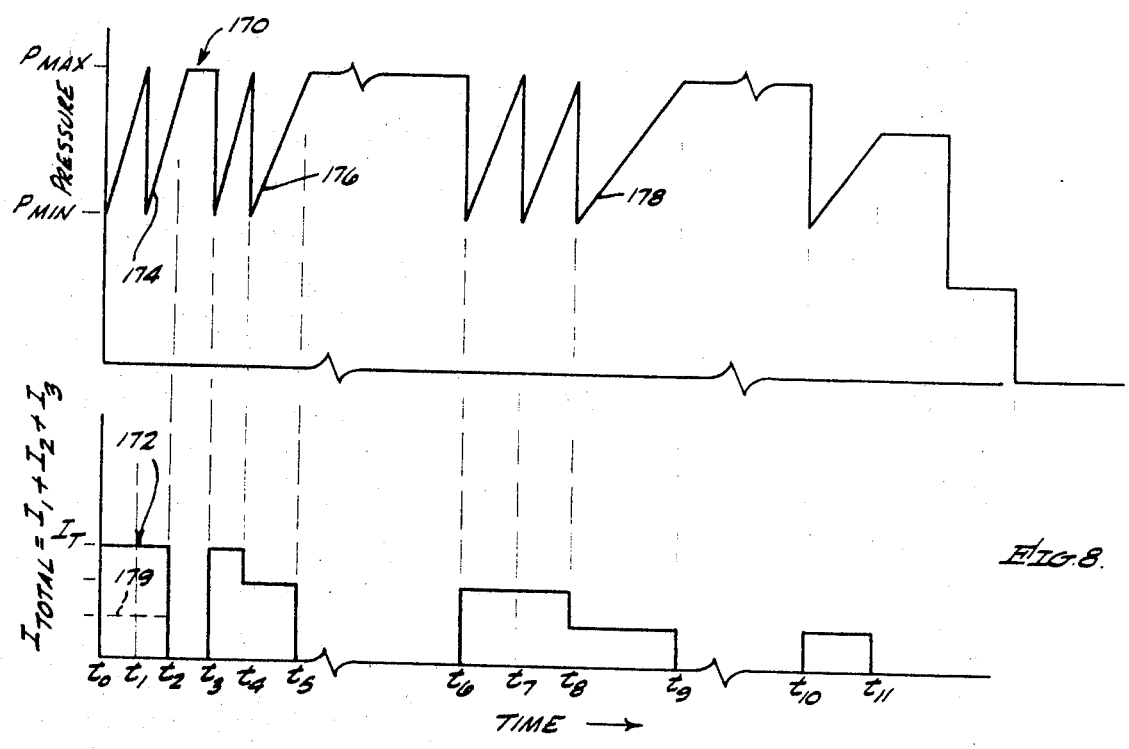
FIG. 8 is a schematic diagram of waveforms showing pressure and current as a function of time for further explaining the remote determination of liquid level in accordance with the invention.

Referring now to FIG. 8 as well as to FIGS. 1 and 7, the information that may be developed in accordance with the invention for remote determination of liquid level will be further explained. For completeness of explanation, the curves of FIG. 8 are based on a system utilizing three storage tanks as shown in FIGS. 1 and 4. A curve 170 shows the pressure variation from a maximum value to a minimum value during, after and prior to utilization of the gas in the tanks 11, 13 and 15. A curve 172 shows the total current supplied to the electrodes of the plurality of tanks as well as indicating the individual currents supplied to each electrode. At a time $t_0$, the pressure in the tanks 11, 13 and 15 is at a minimum value such as from initial start up of the system or from a firing or from any utilization of either the gas or liquid. The total current supplied to the anode has a value equal to $I_1+I_2+I_3$ assuming the three tanks of FIG. 3 are being utilized, each with a separate anode. At time $t_1$ slightly before the maximum allowed pressure is reached, the engine may be commanded to be fired. Before the current is removed from the anodes at a time $t_2$, the maximum pressure is reached and the switch 86 (FIG. 7) is opened in response to the pressure transducer 60. Thus, at time $t_2$, the total anode current of the waveform 172 drops to substantially zero. It is to be noted that during the times that current is applied to the anodes, the liquid level or volume of liquid is slowly decreasing. Also if the liquid is being utilized in the utilization device, this also changes the thickness of liquid. At time $t_3$, electrolysis is resumed such as in response to the pressure sensor 60. Between times $t_0$ and $t_4$, the liquid is at a level greater than $h_1$ of FIG. 1 so that all three anodes 25, 27 and 29 are covered and utilizing current. It is to be understood that when the tanks are spinning, the resultant force F is centrifugal or substantially centrifugal the tanks are positioned so that the electrodes are at the furthest portions from the spin axis along the line of force.

At time $t_4$, the pressure has increased after the previous firing during electrolysis until one anode 25 is uncovered by the liquid or $H_2O$, for example. A firing or utilization of the gas may cause the pressure to rapidly fall at time $t_4$. Electrolysis between times $t_4$ and $t_5$ only utilizes a total current $I_2+I_3$. It is to be noted that the rate of pressure rise shown by a slope 174 results from the current being utilized by all three anodes and the rate of pressure rise of a less steep slope 176 results from current being utilized by two anodes.

Between times $t_5$ and $t_6$, the main electrolysis action may be shut down, assuming that no pressure leakage is experienced. It is to be noted that any pressure leakages are corrected by the pressure tranducer 60 starting the electrolysis action. At time $t_6$, the utilization device such as the engine again utilizes the gas pressure until the pressure falls to its minimum value. The electrolysis section of currents $I_2$ and $I_3$ then increases the pressure at a rate similar to the slope 176. At time $t_7$, the utilization device may again be energized with the pressure falling to its minimum value and the electrolysis increasing the pressure to its maximum value. At time $t_8$, another firing or use of the gas may occur at which time the anode 27 becomes uncovered and only the current $I_3$ is supplied to the electrodes, that is, current is only supplied to anode 29. Thus, the rate of pressure rise as shown by a slope 178 is relatively slow because maximum pressure is not developed until time $t_9$. At time $t_{10}$, the utilization device may again be energized such as the engine 14 with the pressure falling to a minimum value and electrolysis occurring in the single tank 15 with a current $I_3$ to increase the pressure with a slope similar to the slope 178, until the anode 29 becomes uncovered at a time $t_{11}$. Thus, at time $t_{11}$ no further electrolysis action may be performed and any further utilization of the gases will permanently reduce the pressure in the tanks. It is to be noted that as each tank is rendered inactive (except the last tank 15), liquid is still electrolyzed in the system but at a slower rate. Thus the total amount of liquid that may be electrolyzed in the system in accordance with the invention is the same as if all anodes were at the level or position of the anode 29.

At the remote station 38 either the curve 170 may be utilized from a plotting or from a recorded graph on a suitable recorder such as strip recorder to indicate when the liquid is at the levels $h_1$, $h_2$ and $h_3$. Between times $t_0$ and $t_4$ it can be determined by the slope 174 that the liquid level is greater than $h_1$. Shortly after time $t_4$ it can be determined from the slope 176 that the anode 25 is uncovered and the remaining volume of liquid is three times $V_1$. Also, shortly after time $t_8$ it can be determined from the slope 178 that the remaining liquid volume is three times $V_2$. At time $t_{11}$ or shortly thereafter, it is readily determinable that all available liquid has been utilized, that is, the remaining volume is three times $V_3$.

Also, from the remote station such as 38 of FIG. 1, the curve 172 of the total current supplied to the electrolyzing system indicates between times $t_0$ and $t_4$ that the liquid level is greater than $h_1$, that is, all three anodes are immersed in liquid. Shortly after time $t_4$ it can be determined that the liquid level is $h_1$ and the remaining volume of liquid is three times $V_1$. Shortly after time $t_8$ it can be determined that the liquid level is $h_2$ and the remaining volume of liquid is three times $V_2$. At time $t_{11}$ with the current substantially at zero, the liquid level is known to be $h_3$ and the volume to be $V_3$ times three. If the individual currents are transmitted or sent to the remote station 38, the current amplitudes of the three currents $I_1$, $I_2$ and $I_3$ as indicated by a dotted line 179, shows that the liquid level is greater than $h_1$, separate currents $I_2$ and $I_3$ with $I_1$ being substantially zero, indicates that the liquid level is $h_2$ or less and a current $I_3$ with currents $I_1$ and $I_2$ being at zero indicates that the liquid level is greater than $h_3$. When currents $I_1$, $I_2$ and $I_3$ are all substantially zero, the liquid level is known to be $h_3$.

The electrodes may have configurations in conformity with the forces applied thereto, the only requirement for reliable liquid determination levels being that the volume of a particular tank at the time of uncovering of the anode is known. If the system of FIG. 4 were mounted on a spinning body with a centrifugal force provided such as by the velocity of a spinning centrifuge, the conformity of earth's gravity and centrifugal force of motion would provide a free liquid surface having a parabolic cross section. Thus the electrodes such as 25, 27 and 29 may have a configuration to conform to the liquid surface in accordance with the principles of the invention. If the force F, such as from motion, was sufficiently large so that other forces such as gravity were relatively minimal, the anodes such as 25 and 27 may have a substantially flat configuration of wire screening, for example, and the anode 29 may have a semispherical surface to conform to the shape of the tank 15 and allow maximum utilization of the liquid. It is to be understood that regardless of the configuration utilized for the electrodes in accordance with the principles of the invention, the remaining liquid volumes may be accurately determined by knowing the shape of the tanks and the shape of the anodes in the positions in the tanks. It is also to be understood that the principles in accordance with the invention are similarly applicable to systems utilizing any desired numbers of tanks having equalization connections therebetween for providing common liquid levels or having control systems for maintaining a known relation between the liquid levels in various tanks. Also, the principles of the invention are applicable to using either pressure or current data, or both, to determine liquid levels.

Thus there has been described a simplified and reliable system for remote determination of liquid or fluid level in systems utilizing electrodes for providing reactions of the liquid. The principles of the invention are equally applicable to electrolysis, heating or any other type of reaction in which energy is either supplied or removed through or from a liquid or in which a chemical reaction is performed in response to the condition of a suitable electrode. Also, the principles of the invention are applicable to any fluid having an equilibrium condition relative to forces applied thereto and with a common or related liquid surface position, plane, level, radial distance from a spin axis considering all forces and mass conditions, depth of liquid or volume of liquid. It is to be noted that the term level or liquid level, as utilized herein, refers not only to a horizontal condition of even altitude such as provided by a gravity force but also refers to the position of a liquid surface relative to a spin axis of a structure or to the radial distance of the liquid surface from a selected axis. In the system operation, the point in time that the exposure of the electrode occurs is determined remotely with no additional metering equipment required and in systems in which the pressure or current parameters are normally transmitted to remote stations, with no additional information conveying channels required. Thus either the magnitude of the electrolysis current or the heating current or the rate of pressurizing allows the remote determination of the number of electrolysis tanks that are operating and of the total fluid remaining in the system.

What is claimed is:

1. A system for determining a liquid volume comprising
   a plurality of tanks adapted to contain a liquid therein and intercoupled to provide a common level of the liquid,
   a plurality of electrodes with an electrode positioned in each tank at positions representative of different common liquid levels, said electrodes being adapted to electrolyze liquid in said tanks,
   a source of current coupled to said plurality of electrodes for applying a constant current to each of said plurality of electrodes, each of said electrodes being adapted to conduct electrolysis current when in contact with said liquid,
   and pressure sensing means coupled to said tanks for developing a signal representative of the rate of pressure rise in said tanks.

2. The combination of claim 1 further including current metering means coupled to said source of current for developing a signal representative of the total current applied to said plurality of electrodes.

3. The combination of claim 2 further including means coupled to said current metering means for remotely indicating the volume occupied by liquid in said tanks, relative to the volume in said tanks at different levels of said plurality of electrodes.

4. A system for determining the level of a liquid comprising
   a plurality of pressure tanks each adapted to hold a liquid for being electrolyzed,
   means interconnecting said tanks so that a liquid maintains a common level,
   a plurality of electrodes with one positioned in each tank so as to each define a different common liquid level,
   a source of current coupled to said plurality of electrodes for individually supplying a substantially constant current to each electrode when said electrode is in substantial contact with the liquid,
   and means coupled to said source of current for developing signals representative of the number of electrodes receiving said constant current and of the level of liquid relative to the levels of said electrodes.

5. A system adapted for monitoring the liquid level in a plurality of pressure tanks mounted on a body spinning around an axis, said tanks providing a gas product in a portion of each tank comprising
   liquid conducting means interconnecting said plurality of tanks for providing common liquid levels relative to said spin axis,
   gas conducting means interconnecting said plurality of tanks to maintain said gas product at substantially common pressures,
   a plurality of electrodes with one positioned in each of said plurality of tanks and with each electrode at a different common level,
   a separate source of substantially constant current coupled to each electrode,
   pressure sensing means responsive to the portion of said tank containing the gas product,
   and remote means responsive to said source of constant current and to said pressure sensing means for indicating the common liquid levels in said tanks.

6. A system comprising
   a structure spinning around an axis and including gas propulsion means,
   a plurality of interconnected pressure tanks adapted to contain liquid in each tank for forming a propulsion gas, said plurality of tanks mounted on said spinning structure for providing a force outward from said axis so that surfaces of the liquid have related positions, an electrode in each tank for providing electrolysis of the liquid therein, each electrode providing a different surface position so that as the related surface position moves away from said spinning axis said electrodes are sequentially uncovered by said liquid, first means coupled to said electrodes capable of applying a substantially constant current to each of said electrodes, each of said electrodes receiving current when in contact with said liquid, and second means coupled to said first means for monitoring the total current supplied to said electrodes for developing signals representative of the liquid volume in said tanks.

References Cited

UNITED STATES PATENTS

| | | | |
|---|---|---|---|
| 1,380,183 | 5/1921 | Boisen | 204—230 |
| 1,454,531 | 5/1923 | Barnes et al. | 204—230 |
| 1,950,595 | 3/1934 | Clason | 204—230 XR |
| 1,961,893 | 6/1934 | Wadman et al. | 204—229 XR |
| 2,701,790 | 2/1955 | Goument | 204—278 XR |
| 2,773,497 | 12/1956 | Anzi et al. | 204—195 XR |
| 3,045,665 | 7/1962 | Moyat | 204—129 XR |
| 3,336,215 | 8/1967 | Hagen | 204—230 |

JOHN H. MACK, Primary Examiner

D. R. JORDAN, Assistant Examiner

U.S. Cl. X.R.

204—195, 270